UNITED STATES PATENT OFFICE.

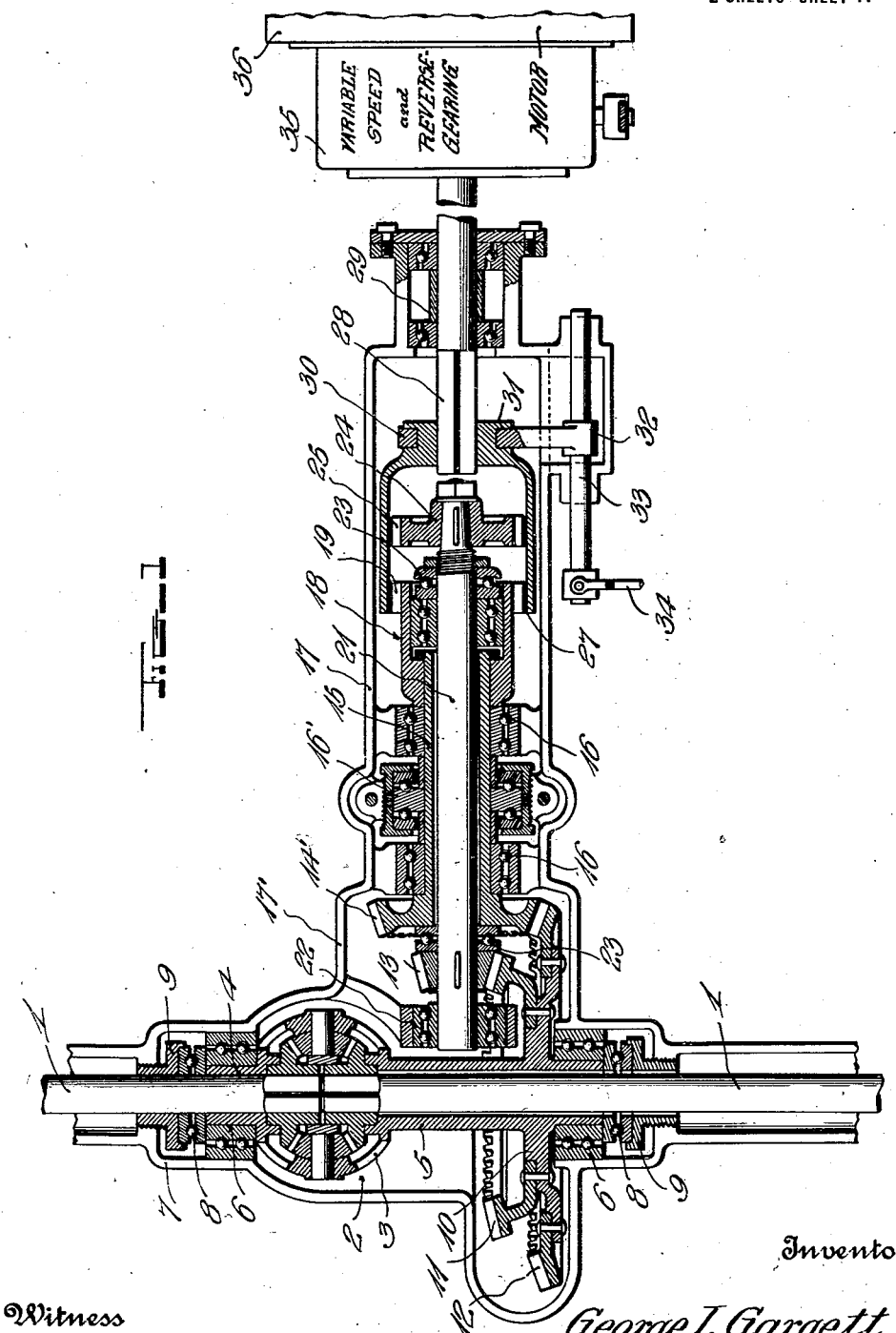

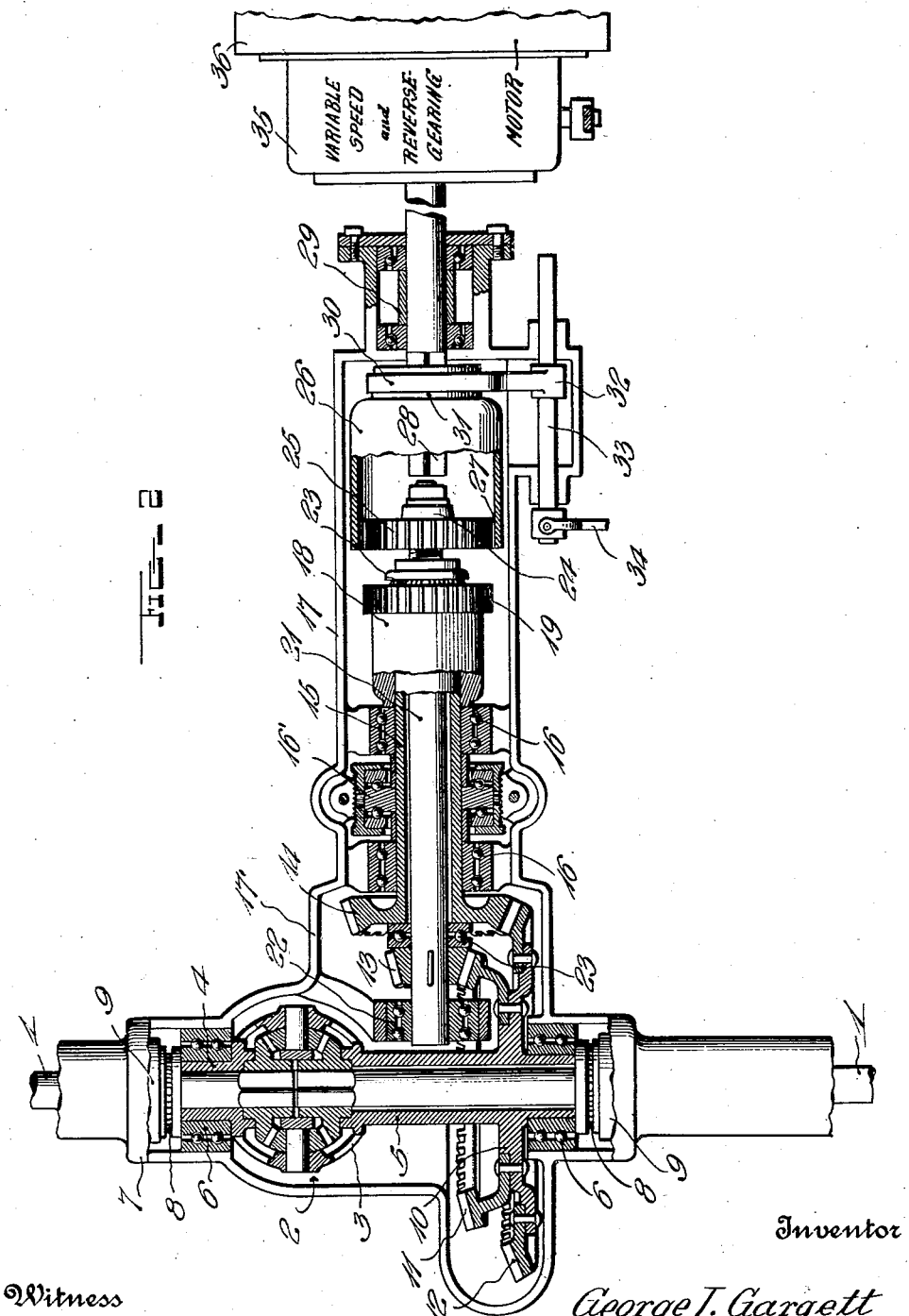

GEORGE IRA GARGETT, OF ALMA, MICHIGAN.

MOTOR-VEHICLE DRIVE MECHANISM.

1,269,530.  Specification of Letters Patent.  Patented June 11, 1918.

Application filed December 17, 1917. Serial No. 207,561.

*To all whom it may concern:*

Be it known that I, GEORGE I. GARGETT, a citizen of the United States, residing at Alma, in the county of Gratiot and State of Michigan, have invented certain new and useful Improvemtnts in Motor-Vehicle Drive Mechanism; and I do declare the following to be a full, clear, and exact description of the invention, such as will enable others skilled in the art to which it appertains to make and use the same.

My invention has for its principal object to provide a simple and compact variable speed transmission to be employed between the usual variable speed and reverse gearing of motor vehicles and the two-part shafts thereof which drive the wheels of the machine, the sections of said shafts either carrying two of the wheels or being operatively connected thereto in any preferred manner, by gears, chains or the like. By the provision of the second set of transmission gears, the operator of the vehicle may take advantage of smooth level stretches and increase the speed of the vehicle without driving the motor above a predetermined speed. Much better results are thus obtained than those derived by driving the motor at an excessive speed, since if the carbureter is set for a certain number of revolutions per minute, any speed above this will result in poor mixing of the air and gas. Furthermore, the ignition system does not operate properly when the motor is driven at a speed above that at which it is intended to travel.

A further object of the invention is to so construct the transmission gearing as to establish substantially a direct drive between the motor and the two-part shaft above referred to, regardless of the adjustment of said gearing for different speeds.

With the foregoing general objects in view, the invention resides in the novel features of construction and unique combinations of parts to be hereinafter fully described and claimed, the descriptive matter being supplemented by the accompanying drawings which form a part of this specification and in which:—

Figure 1 is a horizontal section of the improved transmission set for driving at maximum speed; and Fig. 2 is a view similar to Fig. 1 with parts in elevation and showing the relative positions of parts when slower speed and more power is to be transmitted to the wheels.

In the drawings above briefly described, the numerals 1 designate the two halves or sections of the two-part shaft of a motor vehicle, the ends of said shaft driving the wheels of the machine in any preferred manner. The inner ends of the halves or sections 1 are connected by differential gearing 2 which includes a rotatable housing 3, said housing having a relatively short tubular hub 4 extending in one direction around one of the sections 1 and a comparatively long tubular hub 5 projecting in the opposite direction around the other shaft section. The hub 4 and the ends of the hub 5 remote from the housing 3, are rotatably mounted in ball bearings or the like 6 in a suitable tubular casing 7 which surrounds the shaft sections 1. Longitudinal shifting of these sections is prevented by appropriate thrust bearings 8 which abut the other sides of the bearings 6, adjustment of said thrust bearings being effected by the threaded abutments 9.

The tubular hub 5 is provided with an integral annular flange 10 rigidly carrying an inner bevel gear ring 11 and an outer bevel gear ring 12, the two being concentric. A relatively small bevel pinion 13 meshes with the gear ring 11 and a larger bevel pinion 14 meshes with the ring 12, means being provided for driving either one of these pinions so as to control the rotative speed of the two-part shaft above described.

Pinion 14 is formed on one end of an outer tubular shaft 15 which is positioned at right angles to the shaft section 1, said tubular shaft being rotatably supported in ball bearings or the like 16 which are mounted in a housing 17 extending from the housing 17' at the center of the casing 7, said last named housing containing the differential gearing 2 and the gear rings 11 and 12. A thrust bearing 16' preferably of the ball bearing type is also provided for the shaft 15, said bearing being preferably located between the supporting bearings 16 as shown. The end of the shaft 15 opposite the pinion 14, is provided with a hollow cylindrical head 18 which is rigidly keyed thereon, the exterior of said head having a plurality of circumferentially spaced teeth 19, while a ball bearing 20 is housed within said head for rotatably supporting one end of a shaft 21 which passes through the tubular shaft 15 and extends beyond both ends thereof. The other end of shaft 21 is supported by a suitable bearing 22 in the housing 18 and this end of said shaft carries the small bevel pinion 13. Suitable thrust bearings 23 are provided for shaft 21, one of said bearings being located between the two pinions 13 and 14 while the other abuts the outer end of the bearing 20.

The end of the shaft 21 opposite pinion 13 is provided with a suitably shaped head 24 having external clutch teeth 25 spaced from the teeth 19 of head 18 and a hollow clutch member 26 is movable over said head and provided with internal clutch teeth 27 for engagement either with the teeth 19 or 25, said clutch member being mounted slidably on a drive shaft 28, said shaft extending through the front end of housing 17 and being mounted in an appropriate bearing 29 carried within said housing.

For shifting the clutch member 26 into engagement with the teeth 19 or 25, or into a neutral position between these sets of teeth, a collar 30 is mounted in a groove 31 with which the hub of said clutch member is provided, said collar having a lateral arm 32 secured to a sliding shaft 33 parallel with shaft 28, any preferred means such as that indicated at 34 being provided for sliding shaft 33 to the required extent.

The shaft 28 may be driven in any preferred manner but upon most motor vehicles, it will lead to the usual transmission 35 which includes variable speed and reverse gearing, as well as a clutch, the motor 36 being operatively connected with the transmission in any preferred manner. When the invention is so installed, shifting of the clutch member 26 so that its teeth 27 engage the teeth 25 of head 24, will cause shaft 28 to drive shaft 21 and the latter in turn drives the differential housing 3 through the instrumentality of the pinion 13, the gear ring 11, and the hub 5. Under normal circumstances, the drive is effected through the means just described, but whenever a smooth level stretch is encountered and the speed of the vehicle may be increased without injury to any parts thereof, the clutch member 26 is shifted into operative engagement with the head 18 as shown in Fig. 1. The drive is now through the shaft 15 and its pinion 14 to the gear ring 12 and from this ring to the differential housing 3 by way of the hollow hub 5. Greater speed of the vehicle is thus obtained without increasing the speed of the motor and a great deal of fuel is saved.

On account of the advantages above set forth, I consider that my invention resides not only in the construction of my improved transmission regardless of the manner in which it is driven, but in the combination of an auxiliary variable speed transmission for driving the two-part shaft from the usual transmission gearing including variable speed and reverse means. It is also to be understood that the invention is applicable regardless of the exact manner in which power is transmitted from the shaft sections 1 to the wheels of the machine, such details being left entirely to the discretion of the manufacturer and to the conditions which must be encountered.

Since probably the best results are obtained from the several specific details shown and described, these details are preferably employed, but I wish it understood that within the scope of the invention as claimed, numerous minor changes may well be made.

I claim:

1. In a motor vehicle drive mechanism, the combination of a differential housing, a hub extending from said housing, an annular flange on said hub, a pair of concentric bevel gear rings mounted on said flange, an outer tubular shaft, a beveled pinion on one end of said tubular shaft meshing with the outer gear ring, a combined hollow head and clutch member on the other end of said tubular shaft, bearings for said tubular shaft surrounding the same, an inner shaft passing rotatably through said tubular shaft and extending beyond both ends thereof, a bevel pinion on one end of said inner shaft meshing with the inner gear ring, a clutch member on the other end of said inner shaft, bearing means for said inner shaft including a bearing in said combined hollow head and clutch member, a driven clutch member coacting with the aforesaid clutch member and with said combined head and clutch member for driving either shaft, and means for shifting said driven clutch member into either of its operative positions.

2. In a motor vehicle driven mechanism, the combination of a differential housing, a hub extending from said housing, an annular flange on said hub, two concentric bevel gear rings mounted on said flange, an outer tubular shaft, a bevel pinion at one end of said tubular shaft meshing with the outer gear ring, an enlarged hollow head on the other end of said tubular shaft having external clutch teeth, thrust and supporting bearings surrounding said tubular shaft, an inner shaft passing rotatably through said tubular shaft and extending beyond both ends thereof, a supporting bearing for the end of said inner shaft adjacent said pinion, a beveled pinion on this end of said inner shaft and meshing with the inner gear ring, a supporting bearing for the other end of said inner shaft located in said hollow head, a clutch member on this end of said inner shaft having external clutch teeth spaced from the aforesaid teeth, a thrust bearing for said inner shaft disposed between the two pinions, a second thrust bearing for said shaft abutting the last named supporting bearing thereof, a hollow driven clutch member having internal teeth for engagement with either of the aforesaid sets of teeth, and means for shifting said hollow clutch member.

In testimony whereof I have hereunto set my hand in the presence of two subscribing witnesses.

GEORGE IRA GARGETT.

Witnesses:
F. H. ROWLAND,
JOHN P. FRENCH.